(12) United States Patent
Li et al.

(10) Patent No.: US 12,737,605 B2
(45) Date of Patent: Sep. 15, 2026

(54) SUPERCONDUCTING NEUROMORPHIC COMPUTING DEVICES AND CIRCUITS

(71) Applicant: University of Kansas, Lawrence, KS (US)

(72) Inventors: Hao Li, Lawrence, KS (US); Judy Z. Wu, Lawrence, KS (US)

(73) Assignee: University of Kansas, Lawrence, KS (US)

( * ) Notice: Subject to any disclaimer, the term of this patent is extended or adjusted under 35 U.S.C. 154(b) by 507 days.

(21) Appl. No.: 18/280,530

(22) PCT Filed: Mar. 8, 2022

(86) PCT No.: PCT/US2022/071019

§ 371 (c)(1),
(2) Date: Sep. 6, 2023

(87) PCT Pub. No.: WO2022/192864

PCT Pub. Date: Sep. 15, 2022

(65) Prior Publication Data

US 2024/0152742 A1 May 9, 2024

Related U.S. Application Data

(60) Provisional application No. 63/157,917, filed on Mar. 8, 2021.

(51) Int. Cl.
*G06N 3/065* (2023.01)
*G06N 10/40* (2022.01)

(52) U.S. Cl.
CPC ............. *G06N 3/065* (2023.01); *G06N 10/40* (2022.01)

(58) Field of Classification Search
CPC ........ G06N 3/065; G06N 10/40; G06N 3/049; G06N 3/063; G06N 7/01; G06N 3/02; G06N 3/04; H01L 39/025; H01L 39/22
See application file for complete search history.

(56) References Cited

U.S. PATENT DOCUMENTS

| | | | | |
|---|---|---|---|---|
| 9,627,045 B1 | 4/2017 | Mukhanov et al. | | |
| 2005/0123674 A1* | 6/2005 | Stasiak | B82Y 40/00 | 505/471 |
| 2014/0103282 A1* | 4/2014 | Wang | H10N 70/026 | 257/4 |

OTHER PUBLICATIONS

Kim, Y et al., "A Reconfigurable Digital Neuromorphic Processor with Memristive Synaptic Crossbar for Cognitive Computing," ACM J. Emerg. Technol. Comput. Syst. Apr. 27, 2015, vol. 11, Issue 4, Article 38; pp. 1-25. https://doi.org/10.1145/2700234 (Year: 2015).*

Chiarello, F. et al., "Artificial neural network base don SQUIDS: demonstration of network training and operation," Semantic Scholar , Computer Science, Superconductor Science and Technology, May 7, 2012; pp. 1-11. https://arxiv.org/ftp/arxiv/papers/1205/1205.1422. (Year: 2012).*

(Continued)

*Primary Examiner* — Yogesh Paliwal
(74) *Attorney, Agent, or Firm* — Bell & Manning, LLC

(57) ABSTRACT

A neuromorphic computing circuit includes a plurality of memristors that function as synapses. The neuromorphic computing circuit also includes a superconducting quantum interference device (SQUID) coupled to the plurality of memristors. The SQUID functions as a neuron such that the plurality of memristors and the SQUID form a neural unit of the neuromorphic computing circuit.

20 Claims, 10 Drawing Sheets

Memristor SQUID Neural Unit

(56) References Cited

OTHER PUBLICATIONS

Hansen, Mirko. On the development of memristive devices for electroforming-free and analog memristive crossbar arrays. Diss. Christian-Albrechts Universität Kiel, 2018 (Year: 2018).*

The International Search Report and Written Opinion issued on Jun. 3, 2022 for international patent application number PCT/US22/71019; pp. 1-8.

Kim, Y et al., "A Reconfigurable Digital Neuromorphic Processor with Memristive Synaptic Crossbar for Cognitive Computing," *ACM J. Emerg. Technol. Comput. Syst*. Apr. 27, 2015, vol. 11, Issue 4, Article 38; pp. 1-25. https://doi.org/10.1145/2700234.

Chiarello, F. et al., "Artificial neural network base don SQUIDS: demonstration of network training and operation," *Semantic Scholar, Computer Science, Superconductor Science and Technology*, May 7, 2012; pp. 1-11. https://arxiv.org/ftp/arxiv/papers/1205/1205.1422.

S. Furber, "Large-scale neuromorphic computing systems", *J Neural Eng* 13 (5), 051001 (2016).

V. K. Semenov, "Erasing logic-memory boundaries in superconductor electronics", presented at the 2016 IEEE International Conference on Rebooting Computing (ICRC), 2016 (unpublished).

D. Marković, A. Mizrahi, D. Querlioz and J. Grollier, "Physics for neuromorphic computing", *Nature Reviews Physics* 2 (9), 499-510 (2020).

Schneider, C. A. Donnelly, S. E. Russek, B. Baek, M. R. Pufall, P. F. Hopkins, P. D. Dresselhaus, S. P. Benz, and W. H. Rippard, "Ultralow power artificial synapses using nanotextured magnetic Josephson junctions", *Science Advances* 4 (1), e1701329 (Jan. 26, 2018).

M. L. Schneider, C. A. Donnelly, and S. E. Russek, "Tutorial: High-speed low-power neuromorphic systems based on magnetic Josephson junctions", *Journal of Applied Physics* 124 (16), 161102 (Oct. 25, 2018).

M. L. Schneider, C. A. Donnelly, I. W. Haygood, A. Wynn, S. E. Russek, M. A. Castellanos-Beltran, P. D. Dresselhaus, P. F. Hopkins, M. R. Pufall and W. H. Rippard, "Synaptic weighting in single flux quantum neuromorphic computing", *Scientific Reports* 10 (1), 934 (2020).

* cited by examiner

| Memristor | Values | SQUID | Values |
|---|---|---|---|
| RA ($\Omega \cdot \mu m^2$ at LRS) | ~$10^6$ | SQUID Critical Current $2I_c$($\mu$A) | ~100 |
| Specific Capacitance (fF/$\mu m^2$) | ~20 | SQUID Inductance $L$ (pH) | ~20 |
| ON/OFF ratio | ~100 | Shunt Resistance $R$ ($\Omega$) | ~2.5 |
| High Voltage Level (mV) | ~100 | Capacitance $C$ (fF) | ~500 |
| Set/Reset Voltage (V) | ~1 | Coupling Inductance $L_c$ (pH) | ~5 |
| | | Sensitivity ($\mu V/\Phi_0$) | ~500 |

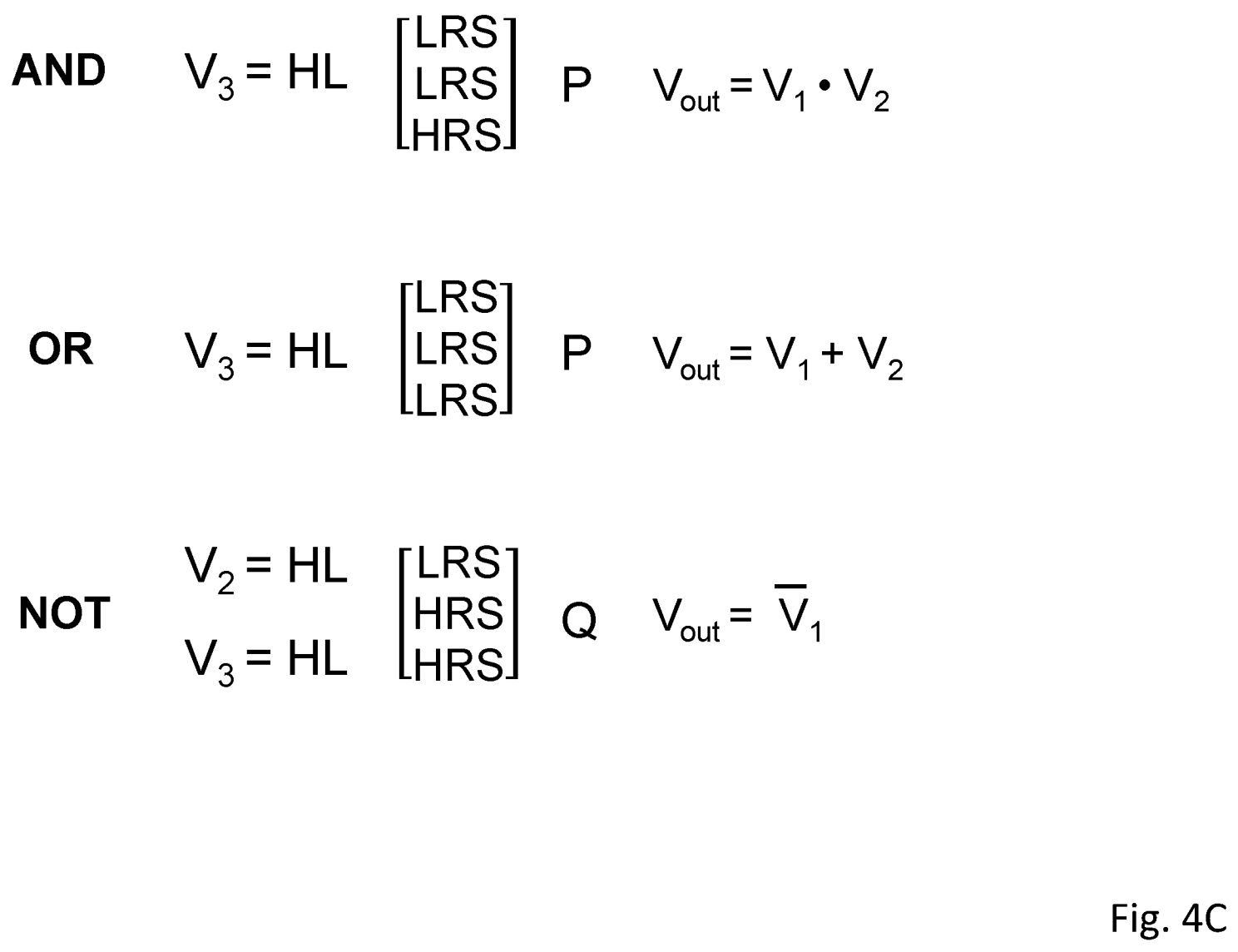

AND $V_3 = HL$ $\begin{bmatrix} LRS \\ LRS \\ HRS \end{bmatrix}$ P $V_{out} = V_1 \bullet V_2$

OR $V_3 = HL$ $\begin{bmatrix} LRS \\ LRS \\ LRS \end{bmatrix}$ P $V_{out} = V_1 + V_2$

NOT $V_2 = HL$, $V_3 = HL$ $\begin{bmatrix} LRS \\ HRS \\ HRS \end{bmatrix}$ Q $V_{out} = \overline{V_1}$

Fig. 4C

| Memristor | Values | SQUID | Values |
| --- | --- | --- | --- |
| RA ($\Omega \cdot \mu m^2$ at LRS) | ~$10^3$-$10^5$ | Critical Current $I_C$($\mu$A) | ~100 |
| Specific Capacitance (fF/$\mu m^2$) | ~10 -$10^2$ | SQUID Inductance $L$ (pH) | ~20 |
| ON/OFF ratio | ~$10^2$-$10^5$ | Resistance $R$ ($\Omega$) | ~2.5-5 |
| High Voltage Level ($\mu$V) | ~10 -$10^3$ | Capacitance $C$ (pF) | ~125-500 |
| Set/Reset Voltage ($\mu$V) | ~$10^2$ -$10^4$ | Input Coupling $M_{in}$ (pH) | ~5-10 |
| | | Sensitivity ($\mu V/\Phi_0$) | ~500-1000 |

Fig. 6

SUPERCONDUCTING NEUROMORPHIC COMPUTING DEVICES AND CIRCUITS

CROSS-REFERENCE TO RELATED APPLICATION

The present application is a National Stage of International Application No. PCT/US22/71019, filed Mar. 8, 2022, which claims priority to U.S. Provisional Patent App. No. 63/157,917 filed on Mar. 8, 2021, the entire disclosures of both of which are incorporated by reference herein.

REFERENCE TO GOVERNMENT RIGHTS

This invention was made with government support under NSF-EECS-1809293 and under NSF-DMR 1909292 awarded by the National Science Foundation. The government has certain rights in the invention.

BACKGROUND

Neuromorphic computing (NC) is a brain-inspired computing paradigm, which utilizes artificial synapses and neurons, rather than separate processing and memory units as used in a von Neumann architecture. Neuromorphic computing is well suited to address the critical issues in modern computing platforms, to provide hardware for thriving artificial intelligence (AI), and to potentially converge with quantum computing (QC) in the future.

SUMMARY

An illustrative neuromorphic computing circuit includes a plurality of memristors that function as synapses. The neuromorphic computing circuit also includes a superconducting quantum interference device (SQUID) coupled to the plurality of memristors. The SQUID functions as a neuron such that the plurality of memristors and the SQUID form a neural unit of the neuromorphic computing circuit. In some embodiments, the plurality of memristors are in the form of a memristor crossbar array. In an illustrative embodiment, each memristor in the plurality of memristors includes a pin-hole free, uniform, and atomically thin tunneling barrier. In another embodiment, the plurality of memristors are ultra-thin memristors having a thickness of less than 3 nanometers. In another embodiment, each memristor in the plurality of memristors includes tunable high resistance state (HRS), on/off ratio, and switching speed in at least three orders of magnitude such that different memristors in different layers of the neuromorphic computing circuit have different properties and such that different columns in a given layer of the neuromorphic computing circuit have different properties. In yet another embodiment, the plurality of memristors include superconducting niobium electrodes, and the superconducting niobium electrodes are lossless at cryogenic temperatures below 9.3 Kelvin.

In another illustrative embodiment, the neural unit comprises a circuit layer formed from three or more memristors and one or more SQUIDs, where the three or more memristors include different resistance states such that the three or more memristors form a set of AND, OR, and NOT logic gates. In such an implementation, the one or more SQUIDs operate as a driving and readout circuit in the circuit layer. In another implementation, the circuit layer comprises a first circuit layer, and the neuromorphic computing circuit includes a plurality of circuit layers that are coupled to one another. As such, an output of the one or more SQUIDs in the first circuit layer act as an input to a second circuit layer of the neuromorphic computing circuit.

In another embodiment, the SQUID includes electrodes that have a superconducting transition temperature of 9.3 Kelvin, and is formed from a superconducting loop and two Josephson junctions. In some implementations, the SQUID is biased at a percentage of its zero-field critical current, and a logic flux bias is applied to control a working point of the SQUID. In another embodiment, the SQUID is configured to generate an output voltage responsive to a determination that an electrical current difference in the plurality of memristors exceeds a threshold value. In such an embodiment, the output voltage is proportional to an amount of the electrical current difference.

An illustrative method of forming a neuromorphic computing circuit includes forming a plurality of memristors that function as synapses and forming a superconducting quantum interference device (SQUID) that functions as a neuron. The method also includes coupling the SQUID to the plurality of memristors such that the plurality of memristors and the SQUID form a neural unit of the neuromorphic computing circuit. In an illustrative embodiment, each memristor in the plurality of memristors is formed to include superconducting electrodes and wires. In another illustrative embodiment, the neural unit forms part of a circuit layer and includes three or more memristors and one SQUID, and the memristors are formed to include different resistance states such that the three or more memristors form a set of AND, OR, and NOT logic gates. The circuit layer can be a first circuit layer, and the method can further include forming a plurality of circuit layers that are coupled to one another to form the neuromorphic computing circuit. In another embodiment, forming the SQUID includes forming a superconducting loop and two Josephson junctions.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 4C depicts different combinations of resistance states of memristor and input voltages for the universal logic gates "AND", "OR" and "NOT" in accordance with an illustrative embodiment.

FIG. 6 depicts a table with device specifications for scalable and extreme energy-efficient memristor/SQUID neural units in accordance with an illustrative embodiment.

DETAILED DESCRIPTION

Figure 1:
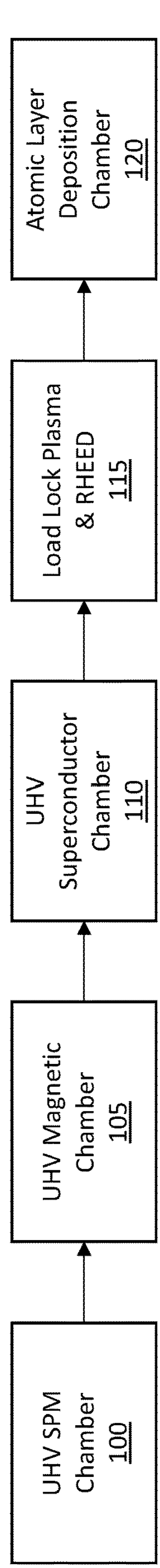
FIG. 1 depicts a system for fabricating atomically thin insulating materials with atomic resolution controllability for use in the proposed neuromorphic computing system in accordance with an illustrative embodiment.

Described herein are neuromorphic computing (NC) systems and methods which improve upon traditional computing technologies. For example, the data-movement bottleneck (von Neumann bottleneck) problem in modern computing systems can be overcome in a NC system, where the information is processed and stored in the same units. Additionally, the basic weighted sum operation, also called multiply and accumulate (MAC), in NC is a crucial computation of artificial neural networks. In an illustrative embodiment, NC is a physical system directly mapped to an artificial intelligence (AI) algorithm. Furthermore, it has been shown that NC with quantum hardware will provide an exponential advantage in storage capability over alternative implementations, and that quantum neuromorphic computing is more robust to errors than purely gate-based quantum computing. In general, NC provides next-generation advanced computing that includes high energy efficiency, high speed, intelligence, and parallel computing capabilities.

A critical issue for implementing NC at the chip level is the ability to provide high-quality artificial synapses and neurons with large-scale or even three-dimensional (3D) interconnections. In general, energy efficiency, switching speed, and scalability are three crucial figures of merit for NC devices and circuits. The energy efficiency, defined as synaptic operations per second per watt (SOPS/W), sets the fundamental limit of the NC chip performance under the constraint of the energy budget and the physical limit of materials cooling power. The switching speed of devices determines the time delay between input and output, which becomes critical in real-time applications that use deep neural networks composed of hundreds (or thousands, millions, etc.) of neuron layers. Similar to the semiconductor industry, any serious computing hardware involves scalability (i.e., scaling down and large-scale fabrication). It is therefore important that a physical implementation of NC chips utilizes artificial synapses and neurons that meet the requirements of high energy efficiency, high-speed, and scalability simultaneously, which has been a major challenge in traditional systems.

Neuromorphic computing systems based on Complementary Metal Oxide Semiconductor (CMOS) transistors can be built on large scale for real time artificial intelligence applications, but the energy efficiency is several magnitudes lower than that of a human brain (i.e., $\sim 10^{14}$ SOPS/W). On the other hand, NC based on memristive crossbar arrays is energy efficient. However, the poor yield and large variation of devices, reliance on CMOS-based circuits, and parasitic wiring resistance limits scalability of memristive crossbar sizes that can be reliably operated. Superconducting electronics (SCE) based on Josephson junctions (JJs) is an ideal candidate for extreme energy-efficient NC, considering that it holds the world records for both energy efficiency (e.g., bit energy, $\sim 10^{-23}$ J) and speed (e.g., ~750 GHz) among all digital circuits at the chip level. Unfortunately, no SCE based NC chip with training and learning functions has been successfully demonstrated so far due to the lack of scalable and reliable superconducting synaptic devices, coupled with the lack of a top-to-bottom circuit design scheme.

One motivation in the research and development of NC, or in a larger scope of computing paradigm shift, arises from the fact that the existing processor-centric von Neumann architecture is failing to adapt to the data-centric computing tasks in the era of big data, especially in AI applications. A central objective of the proposed solution is the development of functional NC chips with training and learning functions, based on the understanding of the potential materials properties, device physics and modeling, circuit designs, and fabrication processes.

Therefore, it is imperative and urgent to explore new artificial synapses and neurons that can combine the advantages of new and different materials and devices with ultra-low energy consumption and high-speed, and to interconnect them in scalable networks. The proposed systems, which are based in part on atomic-scale tuned memristors, ultra-sensitive superconducting quantum interference devices (SQUIDs), and energy-efficient superconducting circuits, aims to address several issues critical to NC for next-generation advanced computing.

There are several critical issues in using current technologies for neuromorphic computing. As noted above, in circuits implementing NC, energy efficiency, switching speed, and scalability are important metrics that can be used to determine the circuit performance. The energy efficiency of NC devices depends on the amount of electromagnetic energy used to represent one-bit valid information, and the ohmic dissipation during the information operation and transmission. Thus, a high-quality atomically thin functional layer with smaller electromagnetic energy usage, high conductivity materials, and less Joule heat generated can significantly increase the energy efficiency of NC devices. With respect to speed, the effective resistance, capacitance, and inductance determine the switching speed of NC devices. To achieve high speed or short time-delay, small-size devices (i.e., smaller capacitance and inductance) made of high conductivity materials having a smaller resistance are advantageous. Therefore, making small-size devices with a high-quality atomically thin functional layer and high conductivity materials is important in improving the performance of a NC system.

Another consideration is the scalability of the technology upon which the NC devices and circuits are based, because it is a system-level issue and a trade-off, involving many factors, such as device yields, signal-to-noise ratio (SNR), robustness of circuit design, and mass production efficiency. There are many separate artificial synapses and neurons proposed, but only a few of them can be practically scalable.

Therefore, it is crucial to demonstrate a neuromorphic circuit unit that can reliably perform a complete set of universal logic gates, when exploring NC based on new technologies.

Neuromorphic computing chips based on CMOS technology have a synapse-neuron unit that includes sense amplifiers and charge-based memories, such as static random access memory (SRAM), dynamic random access memory (DRAM), and flash memory. For example, a synapse-neuron unit based on SRAM that can perform "AND" and "OR" logic needs twelve SRAMs and two sense amplifiers, and occupies a sizable area. Large-scale NC chips with millions of neurons and hundreds of millions of synapses, such as BrainScaleS, TrueNorth, Loihi, etc. have been successfully built due to the maturity of CMOS technology. However, the energy efficiency of these NC chips is of the order of $10^{10}$ to $10^{12}$ SOPS/W, which is several magnitudes lower than that of a human brain (e.g., ~$10^{14}$ SOPS/W), where hundreds of billions of neurons and thousands of trillions of synapses operate.

Other NC chips with an architecture based on an array of 6 transistor SRAM (6T-SRAM) bit cells show high energy efficiency, up to ~$10^{15}$ SOPS/W. However, the SNR of this type of chip is inversely proportional to the number of bit cells. To ensure a reasonable SNR, the scale (i.e., the number of bit cells) is limited to several megabytes. In recent years, the growth of NC chips based on CMOS technology has slowed down due to the lower energy efficiency, large area of SRAM cells, and the difficulty of scaling limited by SNR. Therefore, it is imperative to find new energy-efficient and scalable electronic devices that can mimic biological nervous systems.

Memristors (short for memory-in-resistors) have advantages of small-size (~10 nanometers (nm)), fast switching speed (~100 picoseconds (ps)), and relatively high energy efficiency (~$10^{14}$ SOPS/W). Memristors are thus considered to be a promising synaptic weight candidate for next-generation NC chips. However, traditional memristors have suffered from poor yield and large variation of devices, reliance on CMOS-based circuits, parasitic wire resistance, and current sneak path issues, which have limited array sizes and system performance. A pin-hole free, uniform atomically thin tunneling barrier is not only important to mitigate the yield and variation problems of memristive devices, but also improves the energy efficiency because of smaller electrical energy needed to build the conductance filament, and less dissipative leakage current. Moreover, the need for CMOS technology based drivers, converters, or amplifiers every time data goes in/out of the crossbar array (as pre-neurons and post-neurons) causes a heavy area and power overhead, which can potentially dominate the chip area and energy efficiency of the whole NC system. To address these issues, new types of artificial neurons based on compatible technology are proposed herein to provide high energy-efficiency, simple device configuration, and high sensitivity to readout the summation current through each memristor in the same column, which is a result of MAC operation via Ohm's law and Kirchhoff's law.

Superconducting electronics (SCE) are an ideal candidate for extreme energy-efficient neuromorphic computing. In particular, SCE holds the highest energy efficiency (bit energy, ~$10^{-23}$ J) and speed (~750 GHz) records in all digital circuits at the chip level. However, so far, there have been no reports of SCE-based functional NC chips, mainly due to the lack of scalable and reliable superconducting synaptic devices. Although an individual synaptic device based on magnetic Josephson junction can be demonstrated, considering the delicate competition mechanism between superconductivity and ferromagnetism and complex ultra-thin magnetic barrier structure, the device has scalability issues in terms of device yield and uniformity. To implement superconducting NC chips, it is important to find synaptic devices that can work at a cryogenic temperature and that are scalable and compatible with superconductive technology.

Described herein is the first neuromorphic computing system to utilize superconducting memristors (i.e., to mimic synapses of the human brain) combined with superconducting quantum interference devices (SQUIDs) (i.e., to mimic neurons of the human brain). The memristor utilizes superconducting wires and electrodes such that the memristor is free of parasitic resistance, which results in the ability to scale the system up without having high heat and power requirements. The proposed memristor also includes a high level of atomic tunability in which parameters can be controlled over 3 orders of magnitude or more. This tunability and control of individual memristors is important as it allows different memristors to have different operating parameters, similar to real synapses in the human brain. In one embodiment, the tunable parameters of the memristor include high state resistance, switching speed (which corresponds to how fast synapse spikes travel in a human brain), and on/off ratio (which corresponds to the amplitude of synapse spikes in the human brain). In an illustrative embodiment, the proposed components can be used to construct a highly efficient neuromorphic computing system that includes multilayer circuits, each of which includes billions of memristors and millions/billions of SQUIDs.

More specifically, described herein are novel superconducting neuromorphic circuits that include atomically tuned memristors as synapses and ultra-sensitive superconducting quantum interference devices (SQUIDs) as neurons. In an illustrative embodiment, the proposed system builds on the recent progress made on ultrathin (thickness<3 nm) memristors with i) relevant memristor parameters that are fully tunable at the atomic scale, ii) superconducting Niobium (Nb) (i.e., Nb, with superconducting transition temperature $T_c$~9.3 Kelvin (K)) wires and electrodes that can be lossless when operating at cryogenic temperatures at or below 9.3 K, and iii) SQUIDs, especially nano-SQUIDs. The use of superconducting wires and electrodes removes parasitic resistance from the memristor, resulting in reduced power loss by a factor of $10^6$ as compared to traditional systems. In alternative implementations, additional and/or different components may be included in the system. In another alternative embodiment, a different superconductor, transition temperature, and/or maximum memristor thickness may be used.

As one example (detailed below), a neural unit can be achieved using 3 memristors and one SQUID. This neural unit can perform a complete set of universal logic gates "AND, OR, and NOT" when the different resistance states of the memristors are applied. This design has several unique advantages including high-quality, high yield, and uniform memristors due to atomic-scale tunability that exhibit excellent performance at a wide range of temperatures including cryogenic temperatures at which the SQUIDs operate. Another advantage of the design is that it results in energy and area efficient devices by using SQUIDs as driving and readout circuits in each neural layer, instead of low-power efficiency CMOS circuits used in traditional systems. Another design advantage is the highly compatible technologies in fabrication of both memristors and SQUIDs, given that the electrodes of the memristors, the memristor wiring, and the SQUIDs can be made of the same superconducting material. In one embodiment, Niobium with a superconducting critical (or transition) temperature $T_c$~9.3 K can be used. In alternative embodiments, other superconductors (and their corresponding critical temperatures) can be used, such as Niobium Nitrate (NbN) with $T_c$~16 K, $YBa_2Cu_2O_7$ with $T_c$~91-92 K, $HgBa_2Ca_2Cu_3O_8$ with $T_c$~135 K, LaBaCuO with Tc~35 K, $HgBa_2Ca_2Cu_3O_{8+\delta}$ with Tc~133-138 K, $LaO_{1-x}F_xFeAs$ with Tc~26 K, etc. This is important to the development of monolithic NC chips. Furthermore, superconducting electrodes significantly increase the energy-efficiency of the hardware and thoroughly eliminate the scaling issue caused by parasitic wiring resistance. Another design advantage is that the proposed memristor+SQUIDs neural circuit is 3D scalable, in contrast to the 2D scalability limitation of CMOS logic circuits. In alternative embodiments, a different number of memristors may be used with each SQUID, such as 4, 5, 6, 9, 12, etc.

The inventors have succeeded in fabrication of ultrathin (total dielectric thickness<3 nm) memristors with relevant properties such as on/off ratio and high-state resistance tunable at an atomic scale. In an illustrative embodiment, the fabrication is performed using an integrated ultrahigh vacuum sputtering and atomic layer deposition (UHV PVD-ALD) system. In addition, UHV scanning probe microscopy and a reflection high-energy electron diffraction (UHV ALD-RHEED) have also been added for in vacuo characterization of the morphology, electronic structure, and crystallinity. Therefore, this UHV PVD-ALD/SPM-RHEED system provides a critical capability for fabrication and characterization of atomically thin insulating materials with atomic resolution controllability. FIG. 1 depicts a system for fabricating atomically thin insulating materials with atomic resolution controllability for use in the proposed neuromorphic computing system in accordance with an illustrative embodiment. The system of FIG. 1 is used for in situ fabrication and characterization of metal-insulator-metal heterostructures. As shown, the system of FIG. 1 includes a UHV SPM chamber 100, a UHV magnetic chamber 105, a UHV superconductor chamber 110, a load lock-plasma and RHEED chamber 115, and an atomic layer deposition chamber 120. In alternative embodiments, fewer, additional, and/or different components may be used in the fabrication system.

Figure 2B:
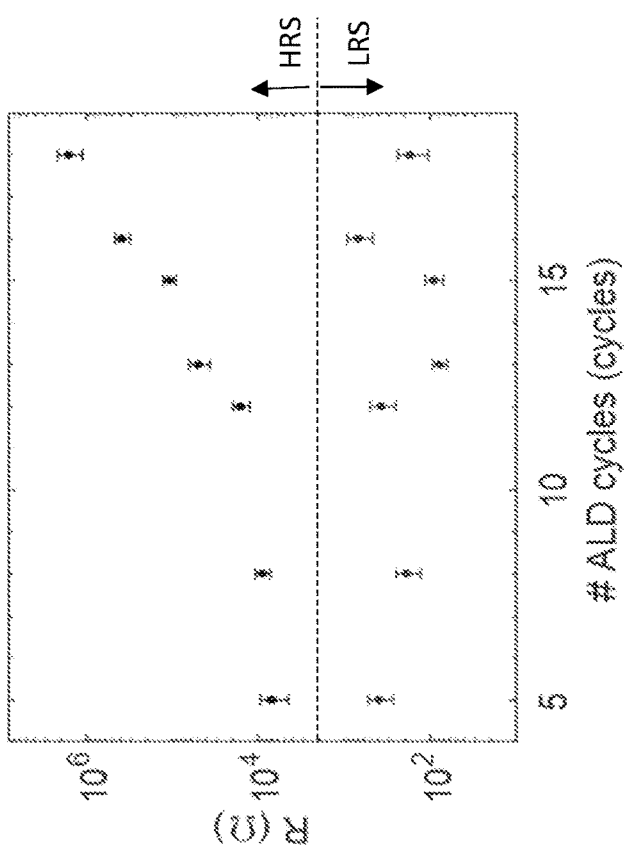
FIG. 2B depicts the memristor RA at a high resistance state (HRS) and a low resistance state (LRS) as a function of the ALD-$Al_2O_3$ cycles in the range of 5-16 cycles in accordance with an illustrative embodiment.
Figure 2A:
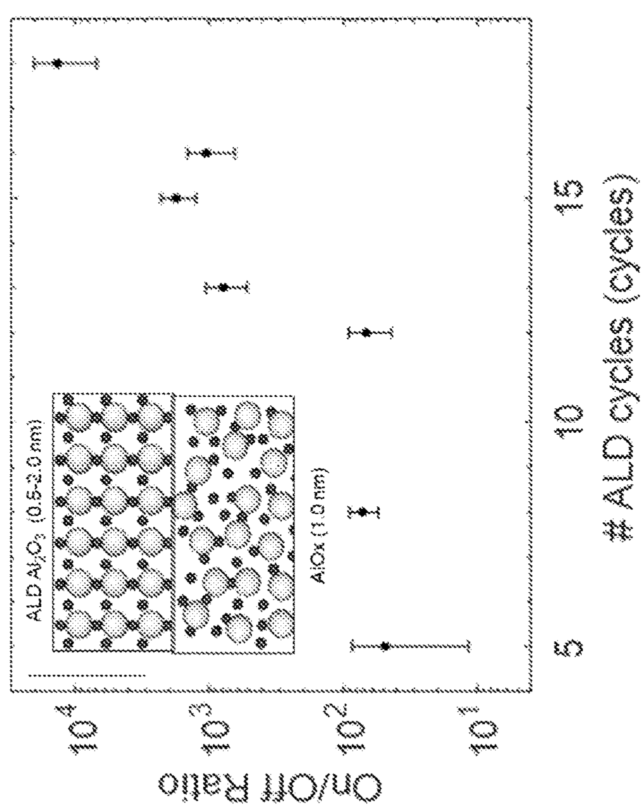
FIG. 2A depicts the on/off ratio for fabricated memristors as a function of the number of atomic layer deposition (ALD)-$Al_2O_3$ cycles (i.e., growth rate of 0.11 nm/cycle) in accordance with an illustrative embodiment.

FIG. 2 depicts characteristics of atomically tuned Pb/ALD-$Al_2O_3$/$AlO_x$/Al memristors fabricated using the system of FIG. 1. Specifically, FIG. 2A depicts the on/off ratio for fabricated memristors as a function of the number of atomic layer deposition (ALD)-$Al_2O_3$ cycles (i.e., growth rate of 0.11 nm/cycle) in accordance with an illustrative embodiment. The inset in FIG. 2A shows the ALD-$Al_2O_3$/$AlO_x$ double layer structure made using in vacuo ALD-$Al_2O_3$ on thermal $AlO_x$. FIG. 2B depicts the memristor RA at a high resistance state (HRS) and a low resistance state (LRS) as a function of the ALD-$Al_2O_3$ cycles in the range of 5-16 cycles in accordance with an illustrative embodiment. The memristor RA refers to the product of resistance (R) and area (A) of a memristor. RA is used for comparison of memristors of different areas. Since resistance is inversely proportional to the area of the memristor, RA allows for elimination of the area dependence in the comparison. As shown, entries above the dotted line in FIG. 2B represent the high resistance state and entries below the dotted line in FIG. 2B represent the low resistance state. The results depicted in FIG. 2 are with respect to Nb/Pb/ALD-$Al_2O_3$/$AlO_x$ (1 nm)/Al/Nb memristors in which the thickness of the ALD-$Al_2O_3$ layer varies in the range of 0.55 nm-1.7 nm (see schematic in FIG. 2A). In alternative embodiments, different thickness of the ALD-$Al_2O_3$ layer may be used.

Thus, for the first time, atomic-scale tuning of the memristor performance has been demonstrated, including the on/off ratio (FIG. 2A), and resistance for the high-resistance and low-resistance states (FIG. 2B). Specifically, the monotonic increasing trends of the on/off ratio and the high-resistance with each additional ALD-$Al_2O_3$ layer (or cycle) of thickness of 0.11 nm illustrate the advantages of the in vacuo ALD approaches developed by the inventors and described herein. It should be noted that the in vacuo ALD is an excellent candidate that combines the strength of MBE (e.g., precise thickness control and low defect density) with its own advantages of conformal coating on surfaces with large aspect ratio, low cost, large scale, and flexibility in material selections. ALD is a chemical process but differs from the conventional CVD and PVD processes in several key aspects. First, the ALD process involves well-defined chemical reaction routes towards formation of the target materials. The related chemical reactants (or precursors) are introduced to the reaction chamber via short pulses sequentially, each followed with a purge of inert gas, for layer-by-layer reactions on the sample surface. Therefore, ALD has several unique advantages including: 1) preliminary reactions between precursors can be minimized; 2) film growth is truly atomic layer-by-layer and self-limiting, which allows atomic-scale control of the film thickness and minimization of the defects such as oxygen vacancies in oxides; 3) the ALD coating is conformal, which is extremely important to forming uniform pinhole-free TBs; and 4) most ALD processes are carried out at low temperatures<500° C., which is compatible with the thermal budget of the Josephson junctions (JJs) and silicon-based microelectronics.

It is envisioned that further improved ultrathin (<3 nm in thickness) Nb/Pd/ALD-$Al_2O_3$/$AlO_x$/Al/Nb memristors can be achieved through optimization of the device design parameters and material properties through a full control of the material properties of the relevant components including the M/I and ALD-$Al_2O_3$/$AlO_x$ interfaces, properties of thermal $AlO_x$ and ALD-$Al_2O_3$ properties, and their relevant thickness on the memristor.

In addition, ALD Nb/Pd/ALD-M1/ALD-M2/Al/Nb memristors can be achieved, which have advantages of uniformity and scalability in device and circuit fabrication, resulting in significantly simplified device and circuit fabrication processes (both ALD-SM1 and ALD-SM2 in ALD chambers equipped with multiple ALD sources). In addition, the proposed fabrication process allows for fully atomic-scale engineering of the M1 and M2 layers for the required memristor performance. There are several candidates for the ALD-SM2 layer that would allow for tunable charge carrier density and that can also form compatible interfaces with the ALD-SM1 layer (such as ALD-$Al_2O_3$). Among other choices, ALD-MgO and ALD-$MgAlO_4$ are particularly interesting candidates for ALD-M1 layer. The inventors have shown that the electronic properties of the ALD-$MgAlO_4$, for example, can be tuned by varying the sequence of the ALD AL-O and Mg—O atomic layer with a band gap continuously tunable in ultrathin (sub-1 nm) film.

Figure 3A:
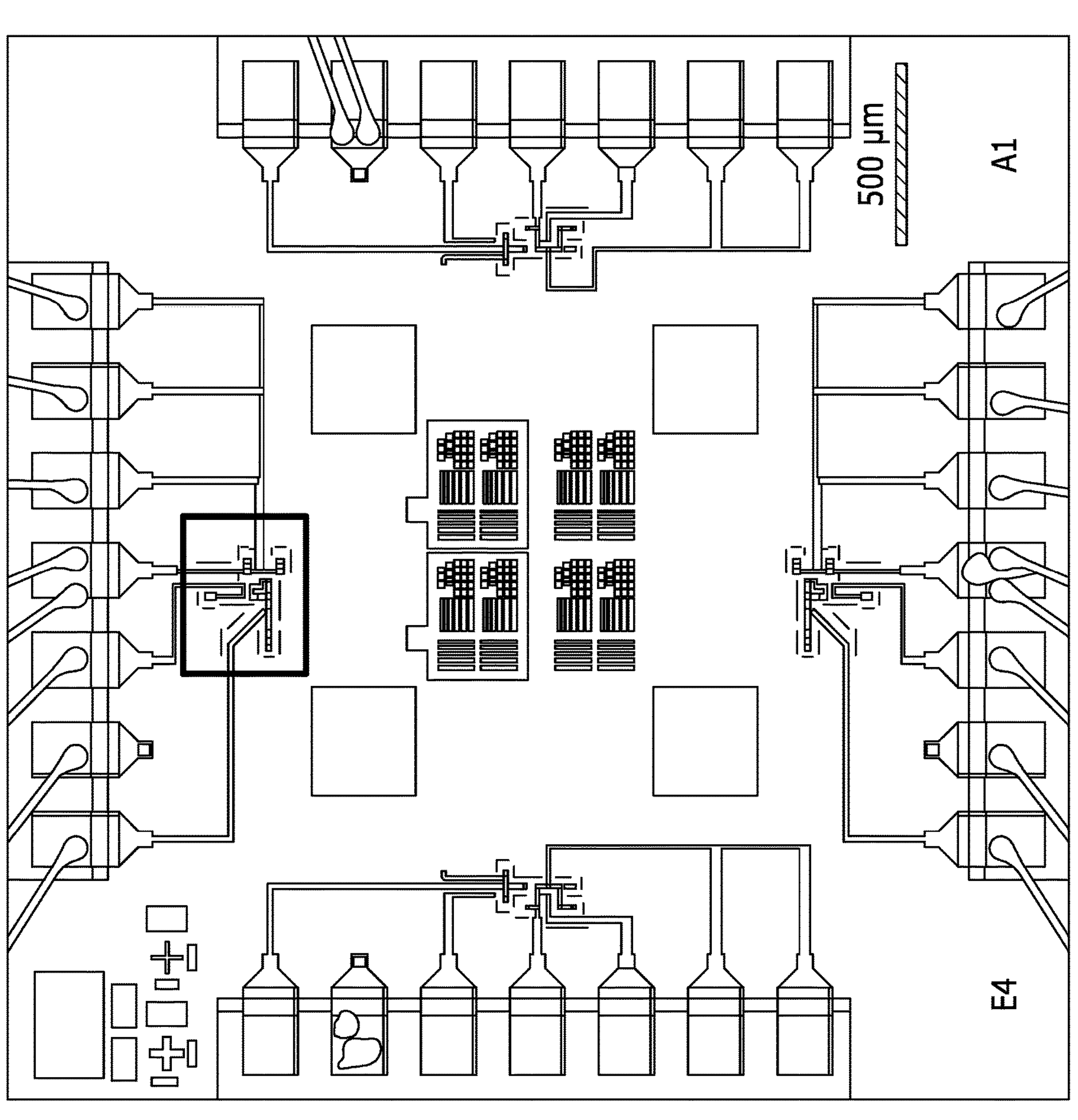
FIG. 3A depicts an image of SCE chips fabricated by niobium integrated circuit technology with a ground plane in accordance with an illustrative embodiment.
Figure 3B:
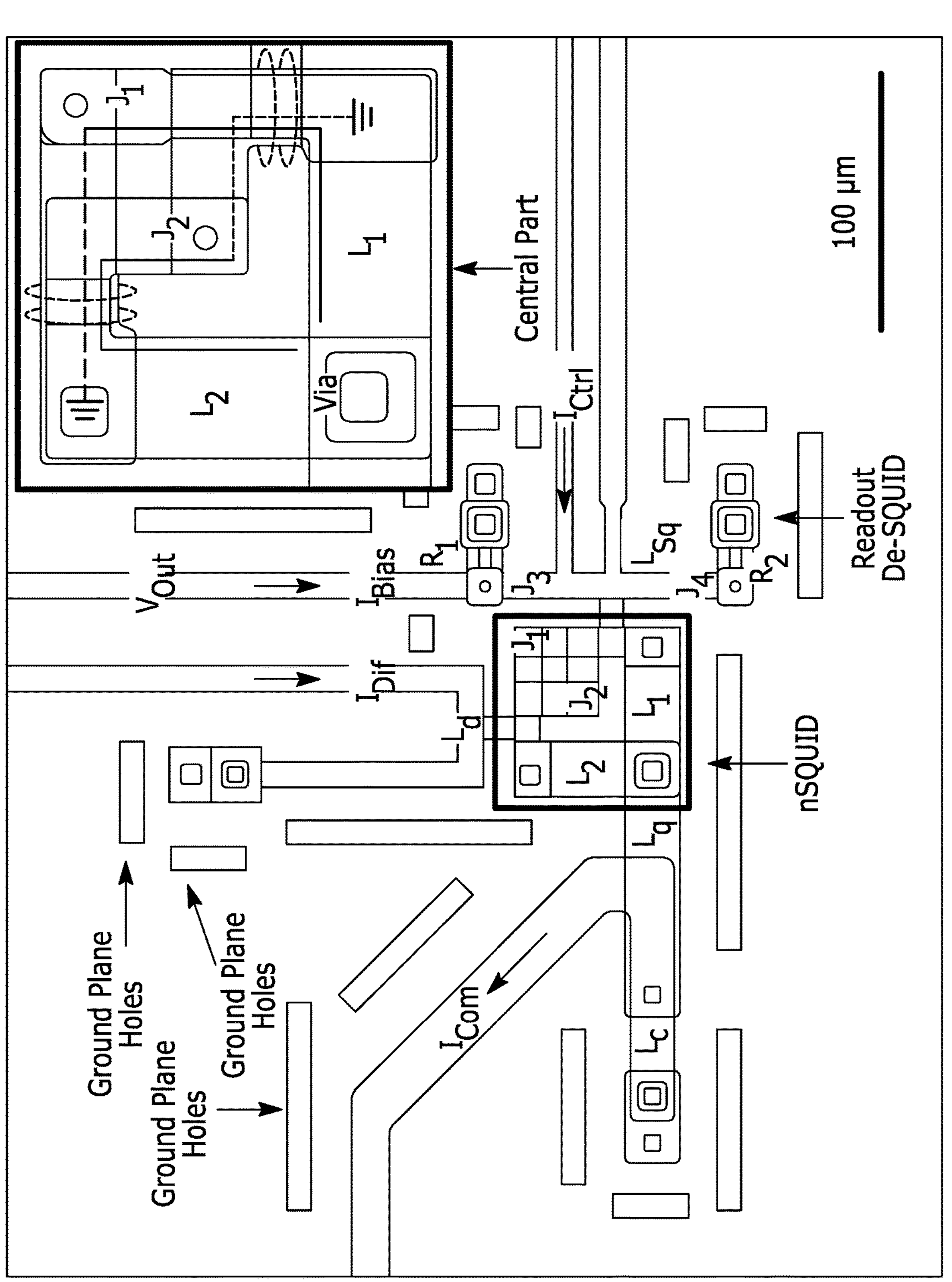
FIG. 3B depicts an energy-efficient superconducting circuit (negative-inductance SQUID (nSQUID)) with readout by a dc-SQUID in accordance with an illustrative embodiment.

As discussed above, the proposed system also utilizes ultra-sensitive superconducting quantum interference devices (SQUIDS). In an illustrative embodiment, a SQUID used in the proposed system can include a superconducting loop and two Josephson junctions, and can be used as an ultra-sensitive detector for a magnetic field (e.g., as low as ~0.09 $fT/Hz^{1/2}$), or any physical quantities that can be transferred into the magnetic field. In previous research, SQUIDs have been explored for use as either nanoscale energy-efficient transimpedance amplifiers, or readout circuits for ultra-low energy-efficient superconducting circuits. FIG. 3 shows an optical micrograph of an energy-efficient SCE chip. Specifically, FIG. 3A depicts an image of SCE chips fabricated by niobium integrated circuit technology with a ground plane in accordance with an illustrative embodiment. FIG. 3B depicts an energy-efficient superconducting circuit (negative-inductance SQUID (nSQUID)) with readout by a dc-SQUID in accordance with an illustrative embodiment.

Figures 4A, 4B:
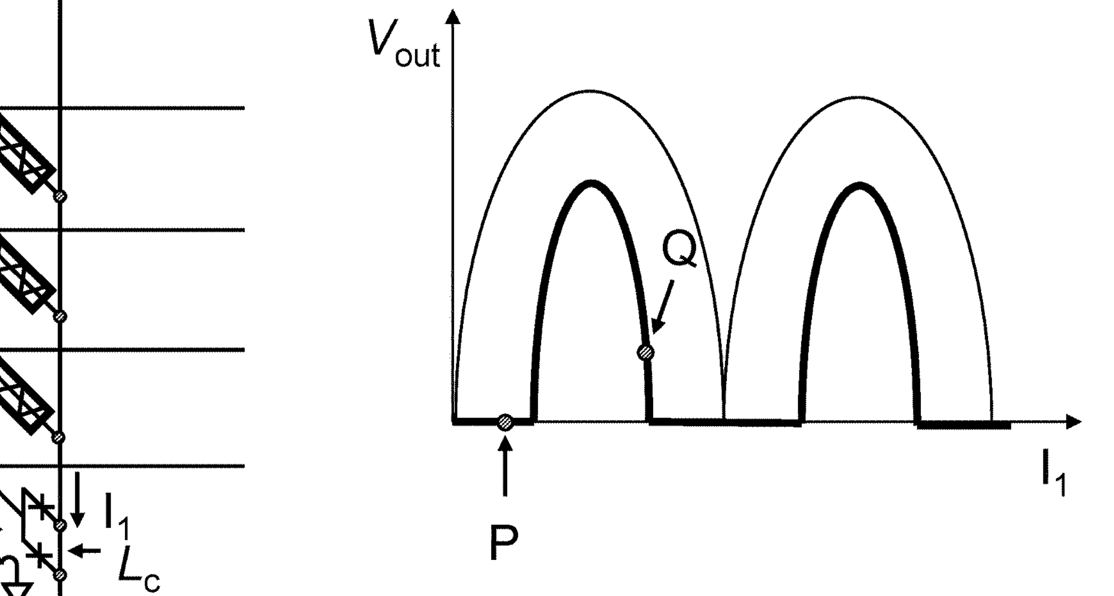
FIG. 4A depicts the design of a single neural unit composed of 3 memristors (as synapses) and 1 SQUID (as a neuron) in accordance with an illustrative embodiment.
FIG. 4B is a table that lists device specifications for the energy-efficient memristor-SQUID neural unit in accordance with an illustrative embodiment.

The design and simulation of memristor-SQUID neural units is described below. In an illustrative embodiment, the proposed neural unit can be composed of six atomic-scale tuned memristors (synapses) and one or more ultra-sensitive SQUIDs (neurons). This proposed neural unit has been demonstrated to perform a complete set of universal logic gates with AND, OR and NOT functionalities when the different resistance states of these memristors are applied. FIG. 4 depicts such a neural unit. Specifically, FIG. 4A depicts the design of a single neural unit composed of 3 memristors (as synapses) and 1 SQUID (as a neuron) in accordance with an illustrative embodiment. In alternative embodiments, a different number of memristors and/or SQUIDs may be used to form the neural unit, depending on the desired characteristics.

The basic operation of the unit depicted in FIG. 4A has been simulated by WRSPICE with various device specifications. FIG. 4B is a table that lists device specifications for the energy-efficient memristor-SQUID neural unit in accordance with an illustrative embodiment. The parameters in the specifications are typical values for memristors with ~13 ALD cycle $Al_2O_3$ and for SQUIDs with optimal design parameters, $\beta_C=2\pi I_C R^2 C/\Phi_0 \sim 1$ and $\beta_L=2I_C L/\Phi_0 \sim 1$ (fabrication process with critical current density, $J_C \sim 1$ µA/µm$^2$). To ensure the feasible readout of the current from the memristor array by the SQUIDs, the input voltages at high level (HL) are set at ~100 mV, which results in a current of ~10 µA through a memristor with a low resistance state (LRS) of 10 kΩ. Also, the coupling of $M_{in}$ between the current and SQUIDs is designed to be ~5 pH.

Figure 5B:
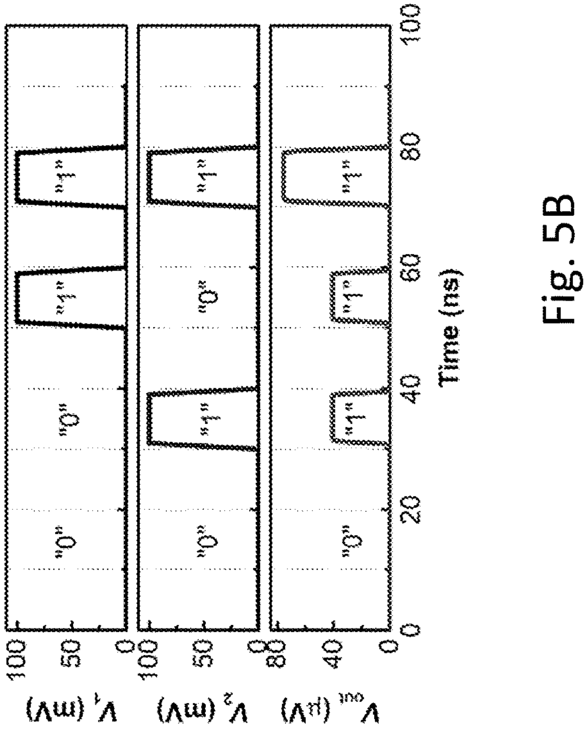
FIG. 5B depicts simulation results of an "OR" gate, where $V_{out}=V_1$ OR $V_2=V_1+V_2$ in accordance with an illustrative embodiment.
Figure 5A:
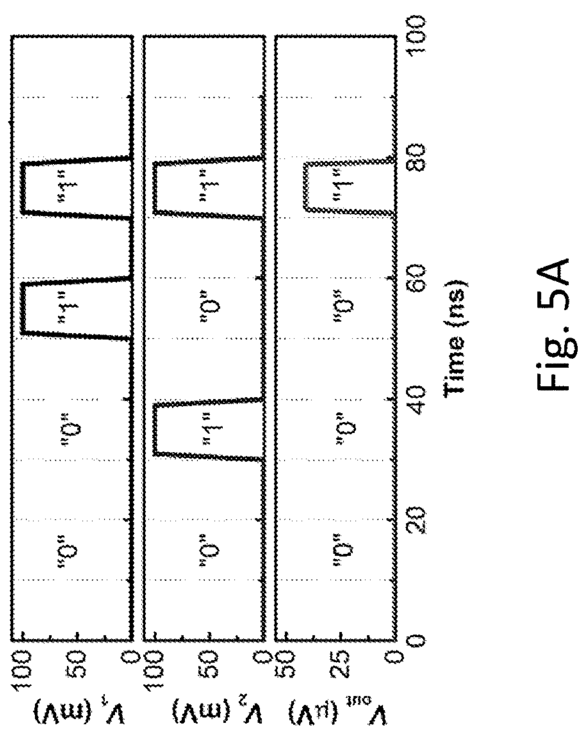
FIG. 5A depicts simulation results of an "AND" gate, where $V_{out}=V_1$ AND $V_2=V_1 \cdot V_2$ in accordance with an illustrative embodiment.
Figure 5C:
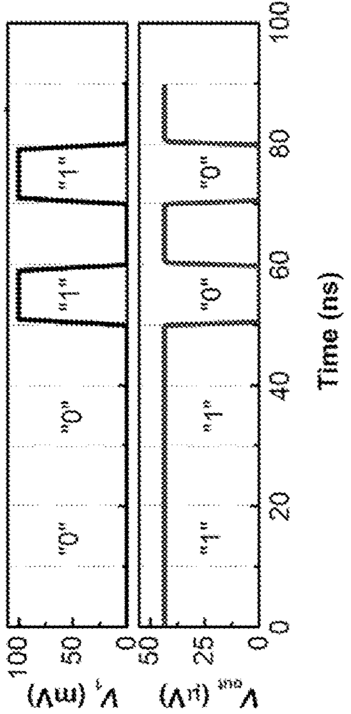
FIG. 5C depicts a "NOT" gate, where $V_{out}=$NOT $V_1=\bar{V}_1$ in accordance with an illustrative embodiment.

FIG. 4C depicts different combinations of resistance states of memristor and input voltages for the universal logic gates "AND", "OR" and "NOT" in accordance with an illustrative embodiment. The corresponding WRSPICE simulated results of the neural unit for these universal logic gates are shown in FIG. 5. FIG. 5A depicts simulation results of an "AND" gate, where $V_{out}=V_1$ AND $V_2=V_1 \cdot V_2$ in accordance with an illustrative embodiment. FIG. 5B depicts simulation results of an "OR" gate, where $V_{out}=V_1$ OR $V_2=V_1+V_2$ in accordance with an illustrative embodiment. FIG. 5C depicts a "NOT" gate, where $V_{out}=$NOT $V_1=\overline{V}_1$ in accordance with an illustrative embodiment.

In the simulations, the SQUID was biased at 80% of its zero-field critical current and a logic flux bias was also applied to make the working point of the SQUID~$M_{in}$*HL/LRS away from the voltage state. The idle input voltages in the logic gate are default set at high level (HL). When the current difference between the two columns is larger than 2*HL/LRS, an output voltage is generated by the SQUID. After the SQUID switches to a voltage state, the output voltage is proportional to the amount of the current difference, which explains why the amplitude of the third output pulse in the OR logic shown in FIG. 5B is slightly larger than the first and second output pulses.

Further optimization of the Memristor-SQUID Neural Unit enables extremely efficient neuromorphic computing. For example, in a scalable neural network, the output neuron in each layer can also be the input neuron for the next layer, which requires the output voltage of the SQUID (~20 µV in one embodiment) matching up to the same level of the input voltage (~100 mV in one embodiment). The power of an individual memristor in one embodiment is $V^2/R \sim 1$ µW, which is ~500 times higher than that of the SQUID ($I_C V_{out} \sim 2$ nW). To balance the energy-efficiency of the whole circuits, the power of the memristor can be reduced to the same level of that of SQUIDs. To address the above challenge, a new set of device specifications was obtained. FIG. 6 depicts a table with device specifications for scalable and extreme energy-efficient memristor/SQUID neural units in accordance with an illustrative embodiment.

In one embodiment, the input voltage can be reduced to 100 µV, while the ideal value of LRS is supposed to be ~10Ω with an ON/OFF ratio of ~100. This involves use of a very thin tunneling barrier and a high-quality barrier to ensure small LRS and large ON/OFF ratio at the same time. In such an implementation, atomic scale tuning of the memristors is critical. Additionally, in this embodiment, the output voltage and input coupling of the SQUID involves 5-times and 4-times improvement, respectively, compared to the above-discussed embodiment of a single neural unit. The output voltage can be increased to ~100 µV, which can be achieved by using Josephson junctions with higher $J_C \sim 10$ µA/µm$^2$ and high-quality low-noise junction barrier formed by thermal oxidation or ALD. A sizable multi-turn input coil may be utilized to achieve the target coupling, which can potentially reduce the chip area efficiency. The power of the memristor in this embodiment is ~1 nW, while the power of the SQUID is ~10 nW. In an embodiment where every SQUID works together with 3 memristors, the energy-efficiency is balanced between these two devices in the neural network. It is noted that if the number of memristors that every SQUID works with changes, the ideal value of LRS should be changed accordingly to balance the energy-efficiency.

Figure 7A:
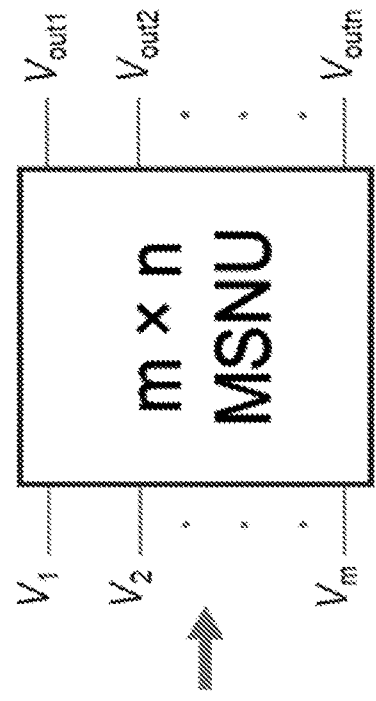
FIG. 7A depicts an m×n memristor SQUID neural unit (MSNU) chip and associated input/output diagram in accordance with an illustrative embodiment.
Figure 7A:
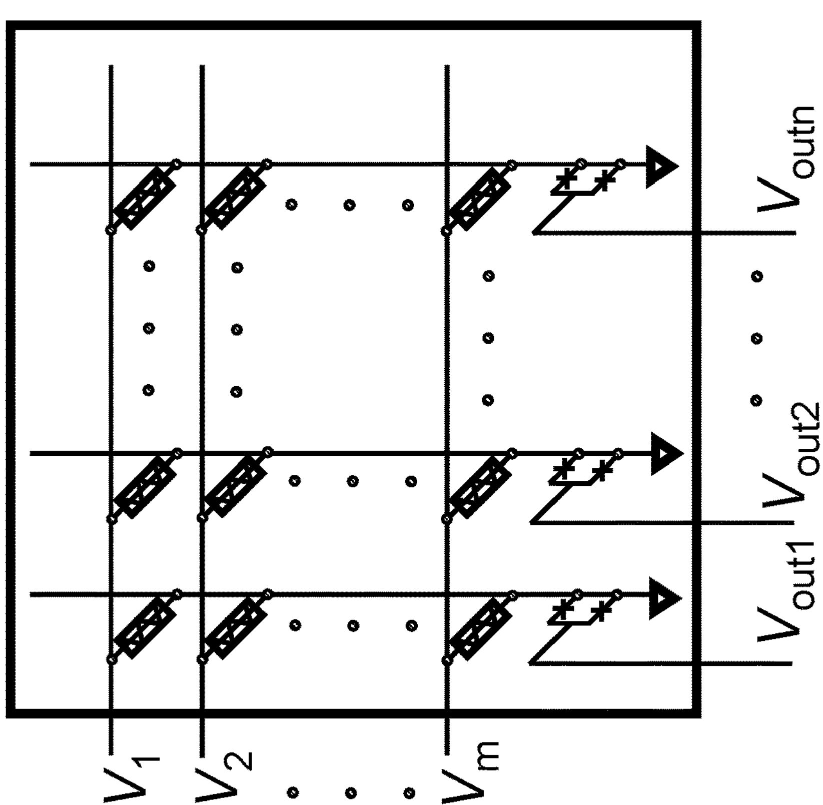
Figure 7B:
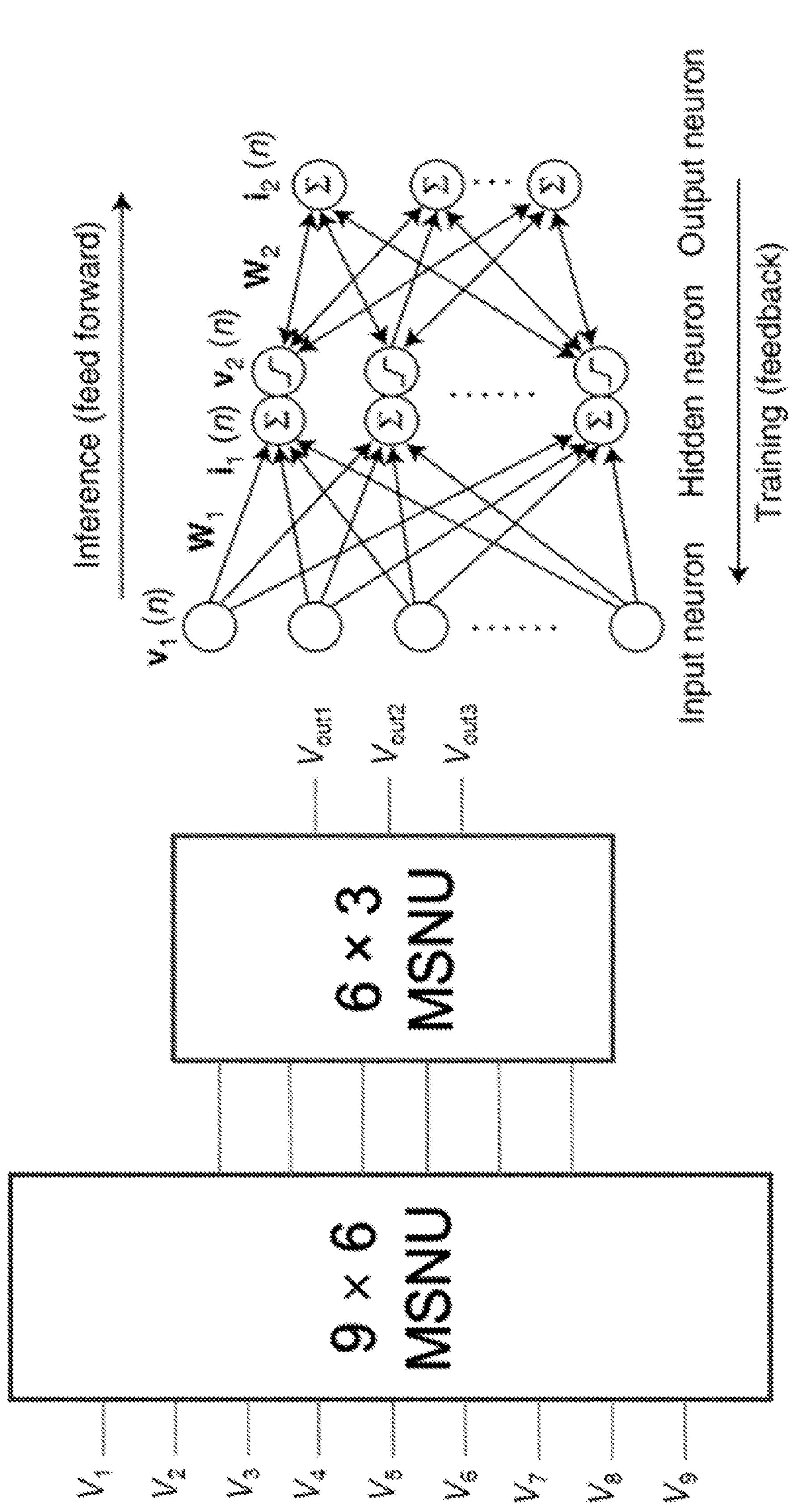
FIG. 7B depicts a two-layer perceptron formed by a 9×6 MSNU chip and a 6×3 MSNU chip in accordance with an illustrative embodiment.

After implementing the universal logic gates and optimizing the neural unit, the scalability of the proposed NC can be proved, allowing for multi-unit neural circuits. FIG. 7A depicts an m×n memristor SQUID neural unit (MSNU) chip and associated input/output diagram in accordance with an illustrative embodiment. In FIG. 7A, the MSNU chip includes an m×n memristor crossbar array and n SQUIDs. FIG. 7B depicts a two-layer perceptron formed by a 9×6 MSNU chip and a 6×3 MSNU chip in accordance with an illustrative embodiment. The two-layer perceptron is an algorithm for classification, and in this implementation includes 9 input neurons, 6 hidden neurons, and 3 output neurons to perform image classification, as shown in the right portion of FIG. 7B. The two-layer perceptron was trained on a dataset of 9-pixel images. In alternative embodiments, different sized chips may be used.

Described below are an illustrative algorithm and simulation for large-scale neural networks. The Modified National Institute of Standards and Technology (MNIST) database of handwritten digits from 0 to 9 is a standard benchmark to gauge new machine learning algorithm and NC hardware. A multi-layer perceptron and a convolutional neural network (CNN) are popular algorithms used to train new NC hardware. As such, the ultimate performance of practical NC chips can be assessed by the accuracy of digit recognition, as well as energy efficiency, chip area, and computing throughput.

As a proof-of-concept, the inventors developed an automated software program in MATLAB to simulate the performance of a two-layer perceptron with 64 input neurons, 32 hidden neurons, and 10 output neurons. The accuracy of digit recognition was ~92% after a thousand training epochs on cropped MNIST data (from 28×28 pixels down to 8×8 pixels).

A typical CNN algorithm includes five layers (e.g., 2 convolutional layers, 2 pooling layers, and a full connected layer) with ~10,000 synaptic weights. A software program was developed to simulate the performance with a 1024×16 memristor crossbar array. The accuracy of digit recognition was ~96% after one thousand training epochs on full MNIST. For example, a memristor-SQUID-neural-network can be formed with two 64×32 memristor crossbar arrays to fulfill the training and recognition of a MNIST dataset. Considering the imperfection of devices, an accuracy of ~90% is expected. In an alternative embodiment, a CNN algorithm can be implemented on the proposed hardware assembled with eight 64×32 memristor crossbar arrays. The accuracy of such an implementation is expected to be 92%. In other alternative embodiments, a different number of memristor crossbar arrays may be used.

Thus, described herein is the first neuromorphic computing system to utilize superconducting memristors (i.e., to mimic synapses of the human brain) combined with SQUIDs (i.e., to mimic neurons of the human brain). As discussed, the memristor utilizes superconducting wires and electrodes such that the memristor is free of parasitic resistance. The proposed memristor also includes a high level of atomic tunability, which allows individual memristors to have different operating parameters. In one embodiment, the tunable parameters of the memristor include high state resistance, switching speed, and on/off ratio. In an illustrative embodiment, the proposed components can be used to construct a highly efficient neuromorphic computing system that includes multilayer circuits, each of which includes billions of memristors and millions/billions of SQUIDs.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A neuromorphic computing circuit comprising:
a plurality of memristors that function as synapses; and
a superconducting quantum interference device (SQUID) coupled to the plurality of memristors and that functions as a neuron such that the plurality of memristors and the SQUID form a neural unit of the neuromorphic computing circuit, wherein the SQUID is configured to generate an output voltage responsive to a determination that an electrical current difference in the plurality of memristors exceeds a threshold value.

2. The neuromorphic computing circuit of claim 1, wherein the plurality of memristors are in the form of a memristor crossbar array.

3. The neuromorphic computing circuit of claim 1, wherein each memristor in the plurality of memristors includes a pin-hole free, uniform, and atomically thin tunneling barrier.

4. The neuromorphic computing circuit of claim 1, wherein each memristor in the plurality of memristors includes tunable high resistance state (HRS), on/off ratio, and switching speed in at least three orders of magnitude such that different memristors in different layers of the neuromorphic computing circuit have different properties and such that different columns in a given layer of the neuromorphic computing circuit have different properties.

5. The neuromorphic computing circuit of claim 1, wherein the plurality of memristors include superconducting electrodes and wires.

6. The neuromorphic computing circuit of claim 5, wherein the superconducting electrodes comprises niobium electrodes and wires that are lossless at cryogenic temperatures below 9.3 Kelvin.

7. The neuromorphic computing circuit of claim 1, wherein the neural unit comprises a circuit layer formed from three or more memristors and one or more SQUIDs, and wherein the three or more memristors include different resistance states such that the three or more memristors form a set of AND, OR, and NOT logic gates.

8. The neuromorphic computing circuit of claim 7, wherein the one or more SQUIDs operate as a driving and readout circuit in the circuit layer.

9. The neuromorphic computing circuit of claim 7, wherein the circuit layer comprises a first circuit layer, and wherein the neuromorphic computing circuit includes a plurality of circuit layers that are coupled to one another.

10. The neuromorphic computing circuit of claim 9, wherein an output of the one or more SQUIDs in the first circuit layer act as an input to a second circuit layer of the neuromorphic computing circuit.

11. The neuromorphic computing circuit of claim 1, wherein the SQUID includes electrodes that have a superconducting transition temperature of 9.3 Kelvin.

12. The neuromorphic computing circuit of claim 1, wherein the SQUID includes a superconducting loop and two Josephson junctions.

13. The neuromorphic computing circuit of claim 1, wherein the SQUID is biased at a percentage of its zero-field critical current, and wherein a logic flux bias is applied to control a working point of the SQUID.

14. The neuromorphic computing circuit of claim 1, wherein the output voltage is proportional to an amount of the electrical current difference.

15. A method of forming a neuromorphic computing circuit, the method comprising:
forming a plurality of memristors that function as synapses;
forming a superconducting quantum interference device (SQUID) that functions as a neuron; and
coupling the SQUID to the plurality of memristors such that the plurality of memristors and the SQUID form a neural unit of the neuromorphic computing circuit, wherein the SQUID is configured to generate an output voltage responsive to a determination that an electrical current difference in the plurality of memristors exceeds a threshold value.

16. The method of claim 15, further comprising forming each memristor in the plurality of memristors to include superconducting electrodes and wires.

17. The method of claim 15, wherein the neural unit forms part of a circuit layer and includes three or more memristors and one SQUID, and further comprising forming the memristors to include different resistance states such that the three or more memristors form a set of AND, OR, and NOT logic gates.

18. The method of claim 17, wherein the circuit layer comprises a first circuit layer, and further comprising forming a plurality of circuit layers that are coupled to one another to form the neuromorphic computing circuit.

19. The method of claim 15, wherein forming the SQUID comprises forming a superconducting loop and two Josephson junctions.

20. A neuromorphic computing circuit comprising:

a plurality of memristors that function as synapses; and a superconducting quantum interference device (SQUID) coupled to the plurality of memristors and that functions as a neuron such that the plurality of memristors and the SQUID form a neural unit of the neuromorphic computing circuit, wherein the SQUID is biased at a percentage of its zero-field critical current, and wherein a logic flux bias is applied to control a working point of the SQUID.

* * * * *